United States Patent
Diez et al.

(10) Patent No.: US 11,642,850 B2
(45) Date of Patent: May 9, 2023

(54) METHOD FOR PRODUCING A COMPONENT BY WAY OF STEREOLITHOGRAPHY

(71) Applicant: Kulzer GmbH, Hanau (DE)

(72) Inventors: Lars Hendrik Diez, Hanau (DE); Abdullah Zary, Hanau (DE); Roger Ritzel, Biebergemünd (DE)

(73) Assignee: Kulzer GmbH, Hanau (DE)

( * ) Notice: Subject to any disclaimer, the term of this patent is extended or adjusted under 35 U.S.C. 154(b) by 175 days.

(21) Appl. No.: 17/266,341

(22) PCT Filed: Jun. 17, 2019

(86) PCT No.: PCT/EP2019/065889
§ 371 (c)(1),
(2) Date: Feb. 5, 2021

(87) PCT Pub. No.: WO2020/030338
PCT Pub. Date: Feb. 13, 2020

(65) Prior Publication Data
US 2021/0308947 A1 Oct. 7, 2021

(30) Foreign Application Priority Data
Aug. 6, 2018 (DE) .................. 10 2018 119 027.1

(51) Int. Cl.
*B29C 64/35* (2017.01)
*B33Y 10/00* (2015.01)
(Continued)

(52) U.S. Cl.
CPC .......... *B29C 64/35* (2017.08); *A61C 13/0019* (2013.01); *B29C 64/129* (2017.08);
(Continued)

(58) Field of Classification Search
CPC . B22F 10/68; B22F 3/24; B29C 64/35; B29C 64/129; B29C 64/188;
(Continued)

(56) References Cited

U.S. PATENT DOCUMENTS 4,575,330 A 3/1986 Hull
8,506,299 B2 8/2013 Gartner et al.
(Continued)

FOREIGN PATENT DOCUMENTS

CN 203831648 U 9/2014
DE 10304757 B4 7/2005
(Continued)

OTHER PUBLICATIONS

Office Action in CN Application No. 201980052257.2 dated Jun. 13, 2022, 11 pages.
(Continued)

*Primary Examiner* — Nahida Sultana
(74) *Attorney, Agent, or Firm* — Marshall, Gerstein & Borun LLP

(57) ABSTRACT

The invention relates to a method for producing a component (9) by means of stereolithography, having the steps of:
A) generating a component (9) in accordance with a virtual 3D model of the component (9) by curing a liquid plastic (7) using stereolithography, and
B) cleaning the component (9) through at least one rotational movement of the component (9) about an axis of rotation or about multiple axes of rotation, wherein residues of the liquid plastic (7) are removed from the surface of the component (9) by a centrifugal force resulting from the rotational movement.
The invention also relates to a 3D printing system for implementing such a method.

33 Claims, 5 Drawing Sheets

(51) Int. Cl.
  *B33Y 30/00* (2015.01)
  *B33Y 70/00* (2020.01)
  *B33Y 80/00* (2015.01)
  *B29C 64/188* (2017.01)
  *B29C 64/241* (2017.01)
  *B29C 64/129* (2017.01)
  *B29C 64/268* (2017.01)
  *B33Y 40/20* (2020.01)
  *A61C 13/00* (2006.01)
  *B29K 31/00* (2006.01)
  *B29K 63/00* (2006.01)
  *B29L 31/00* (2006.01)

(52) U.S. Cl.
  CPC .......... *B29C 64/188* (2017.08); *B29C 64/241* (2017.08); *B29C 64/268* (2017.08); *B33Y 10/00* (2014.12); *B33Y 30/00* (2014.12); *B33Y 40/20* (2020.01); *B33Y 70/00* (2014.12); *B33Y 80/00* (2014.12); *B29K 2031/00* (2013.01); *B29K 2063/00* (2013.01); *B29L 2031/7532* (2013.01)

(58) Field of Classification Search
  CPC ... B29C 64/241; B29C 64/268; B29C 64/245; B29C 64/124; A61C 13/0019; B33Y 10/00; B33Y 30/00; B33Y 40/20; B33Y 70/00; B33Y 80/00; B29K 2031/00; B29K 2063/00; B29L 2031/7532
  See application file for complete search history.

(56) References Cited

U.S. PATENT DOCUMENTS

| | | | |
|---|---|---|---|
| 9,295,534 | B2 | 3/2016 | Ruppert et al. |
| 11,084,216 | B2* | 8/2021 | Murillo .................. B33Y 40/20 |
| 11,433,658 | B2* | 9/2022 | Friedrich ............... B33Y 10/00 |
| 2009/0283119 | A1 | 11/2009 | Moussa et al. |
| 2012/0195994 | A1 | 8/2012 | El-Siblani et al. |
| 2017/0291356 | A1 | 10/2017 | Adachi et al. |
| 2018/0178241 | A1* | 6/2018 | Luo ......................... B05C 3/109 |
| 2019/0240924 | A1* | 8/2019 | Hendrik ................. B33Y 40/20 |
| 2021/0299950 | A1* | 9/2021 | Wolter .................. B29C 64/129 |

FOREIGN PATENT DOCUMENTS

| | | |
|---|---|---|
| DE | 102009056752 A1 | 6/2011 |
| EP | 3174693 A1 | 6/2017 |
| JP | 2011-520655 A | 7/2011 |
| WO | WO-91/07141 A1 | 5/1991 |
| WO | WO-2009/140449 A2 | 11/2009 |
| WO | WO-2013/124452 A1 | 8/2013 |
| WO | WO-2016/013038 A1 | 1/2016 |
| WO | WO-2018/118832 A1 | 6/2018 |
| WO | WO-2019/102304 A1 | 5/2019 |

OTHER PUBLICATIONS

Search Report and Written Opinion in PCT/EP2019/065889 dated Aug. 22, 2019, 12 pages.
Office Action in JP Application No. 2021-506537 dated Jan. 5, 2023, 12 pages.

* cited by examiner

METHOD FOR PRODUCING A COMPONENT BY WAY OF STEREOLITHOGRAPHY

BACKGROUND OF THE INVENTION

Related Technology

The invention relates to a method for producing a component by means of stereo lithography.

The invention also relates to a 3D printing system for producing a component using stereolithography, the 3D printing system having a printing device for position-dependent and layer-wise curing of a liquid plastic and a control.

In addition to manual techniques, digital manufacturing methods are also becoming increasingly important in the field of dentistry. Dental prostheses and other dental moldings, for example crowns, bridges and 3-dimensional models of the oral cavity of a patient, have been subtractively produced in milling processes for several years using CAD/CAM technologies (CAM—computer-aided manufacturing, CAD—computer-aided design).

A CAD/CAM process for producing a dental prosthesis is known from WO 91/07141 A1, wherein, in this process, a prosthesis base based on an impression is milled from a plastic block.

Furthermore, generative CAM processes, such as stereolithography and DLP (digital light processing) for polymer-based dental products such as transitional prostheses, prostheses, orthodontic appliances, bite guards, drilling templates or dental models, for example, are becoming increasingly important.

Stereolithography is currently used to produce prototypes or components made from plastic. Stereolithography is a technical principle of rapid prototyping or rapid manufacturing, in which a workpiece is constructed layer by layer by means of points which materialize in space. The manufacture of one part or multiple parts at the same time conventionally takes place in a fully automatic manner from CAD data provided on the computer. The principle was developed in 1984 by the US physicist Chuck Hull and submitted for patent with patent application U.S. Pat. No. 4,575,330 A. In 3D printing processes which are based on stereolithography, a component is generated by photopolymerization of a liquid plastic. Such stereolithographic 3D printers are known, for example, from US 2017/291 356 A1 and EP 3 174 693 B1.

There are methods, such as the methods known from DE 10 2009 056 752 A1 or WO 2013 124 452 A1, for example, in which a dental part or total prosthesis is prepared digitally and produced via CAD/CAM processes. A method for producing dental prostheses is known from patent DE 103 04 757 B4, in which a virtual placement of the teeth into a virtual model takes place and the production of a prosthesis base based on the virtual model takes place.

After the generation of the components by means of stereolithography, these components have to be freed of liquid plastic residues on their surface. For this purpose, the components additively manufactured by means of stereolithography are currently pre-cleaned manually with compressed air using a compressed-air pistol. The components are subsequently cleaned with a cleaning fluid such as isopropanol in an ultrasonic bath in a final cleaning or post-cleaning in order to remove the residues of the uncured plastic. This is complex since the components have to be handled individually for this. Moreover, in the case of complex geometries, the surface of the components cannot be easily reached in all areas. This applies in particular to hollow forms whereof the internal regions cannot be easily reached by the air flow and in which the cleaning fluid can collect and only be removed again with difficulty.

SUMMARY

The object of the invention, therefore, consists in overcoming the disadvantages of the prior art. In particular, the aim is to provide a method with which components can be manufactured in series, with little effort, by means of stereolithography. The method should proceed in as fully automated a manner as possible. In this case, high-quality and clean components should be presented as the end product. In particular, the cleaning of the components should be simplified and capable of taking place in an automated manner.

The objects of the invention are achieved by a method for producing a component by means of stereolithography, having the steps:

A) generating a component in accordance with a virtual 3D model of the component by curing a liquid plastic on a carrier using stereolithography, wherein the component is generated on the carrier in such a way that the component is positioned on the carrier such that the axis of rotation or at least one of the axes of rotation extends through the region of the center of gravity of the component, in particular extends through the center of gravity of the component, or the axis of rotation or at least one of the axes of rotation extends through the region of the center of gravity of the system comprising the component, the carrier and all parts of the centrifuge module which rotate with the component, in particular extends through the center of gravity of the system, and B) cleaning the component through at least one rotational movement of the component about an axis of rotation or about multiple axes of rotation, wherein residues of the liquid plastic are removed from the surface of the component by a centrifugal force resulting from the rotational movement.

Within the context of the present invention, removing the residues of the liquid plastic from the surface of the component through the centrifugal force resulting from the at least one rotational movement does not mean that residues of the liquid plastic no longer remain on the surface of the component after the cleaning of the component. Therefore, not all residues of the liquid plastic have to be removed from the surface of the component. Remaining residues can still be removed with the aid of post-cleaning. However, considerable simplification of the post-cleaning and a lower cleaning fluid consumption are realized in this case. The method is then still more resource-saving than the method according to the prior art, especially since the liquid plastic separated by centrifugation is recycled and (if necessary, after filtering or cleaning) can be used again to produce new components.

Possible rotational movements are both a uniform rotation, in which multiple rotations take place in the same direction of rotation about the same axis of rotation, and an oscillating rotation, in which the angular speed is realized in an oscillating manner in both directions of rotation and a full rotation through 360° does not need to take place. A rotation about multiple axes of rotation can also take place at the same time or in succession.

It can preferably be provided that the generation of the component in step A) takes place layer by layer. Known stereolithographic processes can thus be used to generate the component.

It can also be provided that the component is generated in step A) in a bath filled with the liquid plastic. The liquid plastic can therefore be returned or conducted back to the bath again during the cleaning in step B).

In inventive methods, it can also be provided that at least 50% of the residues of the liquid plastic which are present on the surface of the component are removed by the centrifugal force, preferably at least 85% of the residues of the liquid plastic which are present on the surface of the component are removed by the centrifugal force, particularly preferably at least 95% of the residues of the liquid plastic which are present on the surface of the component are removed by the centrifugal force.

It is hereby made clear that a notable quantity of the liquid plastic is removed from the surface of the component, but not all of the plastic adhering to the surfaces of the component has to be removed. The cleaning is therefore at least rigorous enough to simplify post-cleaning.

It is furthermore provided that, in step A), the component is generated on a carrier.

The carrier can be used as a building platform for producing the component by means of the stereolithography process and, at the same time, for the cleaning of the component without the component having to be separated from the carrier for this purpose.

In this case, it can be provided that the carrier with the component thereon will be secured, or is secured, in a centrifuge module to clean the component in step B), wherein, preferably, the axis of rotation is specified by the position of the carrier in the centrifuge module or the axes of rotation are specified by the position of the carrier in the centrifuge module.

By using a carrier, the component can be moved from a printing device into the centrifuge module in a simple manner, without the risk of damage to the component. Alternatively, the printing device and the centrifuge module can also be constructed in one piece.

It is furthermore provided that, in step A), the component is generated on the carrier in such a way that the component is positioned on the carrier such that the axis of rotation or at least one of the axes of rotation extends through the region of the center of gravity of the component, in particular through the center of gravity of the component, or the axis of rotation or at least one of the axes of rotation extends through the region of the center of gravity of the system comprising the component, the carrier and all parts of the centrifuge module which rotate with the component, in particular through the center of gravity of the system.

An imbalance disturbing the rotational movement should hereby be prevented during the at least one rotational movement, which, on the one hand, simplifies the mounting of the component or the system of the component, carrier and all rotating parts of the centrifuge module during the rotational movement and, on the other, can prevent damage to the possibly not yet fully cured component as a result of the forces arising due to the imbalance. With the present invention, it has been surprisingly found that, via the suitable positioning or positioning and orientation of the component on a carrier, simple and cost-effective, but at the same time also efficient, cleaning can already be enabled by at least one rotational movement during the generation of the component.

In this case, it is sufficient for the realization of the present invention if the axis of rotation or at least one of the axes of rotation extends closely past the center of gravity in such a way that the forces arising during the respective rotational movement as a result of the resultant imbalance are so low that mounting the carrier does not require any constructional effort which would significantly increase the cost of the device for this (the centrifuge module). In addition, the forces arising during the respective rotational movement as a result of the resultant imbalance should also be so low that deformation or destruction of the not yet fully cured component is prevented. The axis of rotation or at least one of the axes of rotation preferably extends precisely, or as precisely as possible, through the center of gravity of the component in order to keep the imbalance as low as possible.

With the invention, it is also proposed that a step AA) takes place in the method: AA) specifying the position or the position and the orientation of the component to be generated on the carrier before step A), wherein the component is positioned on the carrier in such a way that the at least one axis of rotation of the component extends through a region around a center of gravity of the component, in particular extends precisely through the center of gravity of the component, or the at least one axis of rotation extends through the region around a center of gravity of the system comprising the component, the carrier and all parts of the centrifuge module which rotate with the component, in particular extends precisely through the center of gravity of the system, and characterized by generating the component in the thus determined position or the thus determined position with the thus determined orientation on the carrier in step A).

An imbalance disturbing the rotational movement should also be hereby prevented during the at least one rotational movement, which, on the one hand, simplifies the mounting of the component during the rotational movement and, on the other, can prevent damage to the possibly not yet fully cured component as a result of the forces arising due to the imbalance. Moreover, use is made of the fact that the virtual 3D model is present in any case and this can be used advantageously. In this case, use is made of the fact that the location of the center of gravity can be easily calculated on the virtual 3D model and the position and possibly the orientation can thus be calculated in a simple manner.

In this case, it can be provided that, in step AA), the center of gravity of the component or the system is determined with the aid of the virtual 3D model and the position or the position and the orientation of the component to be generated on the carrier is determined thereby.

The advantages of a computer-aided production of the component are hereby also used in the cleaning thereof.

It can preferably also be provided that the curing of the liquid plastic in step A) takes place using light, UV light or laser light and a photocurable plastic is used as the liquid plastic, in particular an acrylic resin, epoxy resin or vinyl ester resin.

In makes particular sense to use these curing methods together with the cleaning step, since a relatively large quantity of the liquid plastic which is used to generate the component can also remain adhered to the surface of the component there and/or become trapped, but, at the same time, also remains relatively fluid there so that a good cleaning effect can be achieved by the centrifugal force.

It can furthermore be provided that, by means of the method, a dental model or a model of an oral cavity for preparing a dental prosthesis is produced as the component, or a model of a dental prosthesis or dental prosthesis part, in particular a prosthesis base, is produced as the component and generated in step A).

The inventive method is particularly suitable for automated production of models in the field of dentistry and dental products, since the cleaning step is simplified and can be easily carried out in a fully automated manner.

According to the invention, the following step can furthermore be provided: C) post-cleaning the component after step B) with a cleaning fluid, in particular with isopropanol, wherein step C) takes place after step B).

Residues of the plastic which still adhere to the component after the cleaning and other impurities can also be removed by means of the post-cleaning. As a result of the preceding cleaning, the post-cleaning is substantially less complex than when only normal cleaning is carried out in the manner of the post-cleaning.

The removal of residues of the cleaning fluid from the surface of the component by means of a centrifugal force resulting from a rotational movement in step C) can furthermore be provided.

Since the component is, in any case, rotatably mounted for the cleaning in step B) and the center of gravity is possibly suitably aligned, a rotational movement can also be used to remove residues of the cleaning fluid.

A step D) post-curing the component after step B) can furthermore be provided, wherein, during the post-curing, the component is rotated about the axis of rotation or is rotated about at least one of the axes of rotation, wherein the post-curing preferably takes place via post-exposure to light or a heat treatment or via post-exposure to light and a heat treatment.

In this case, the option which is available in any case of being able to rotate the component (in particular being able to rotate the component without a significant imbalance) is also used to simplify post-curing of the component in that the component is rotated during the post-curing. The device for post-curing can thus be constructed more simply and cost-effectively and a more uniform post-curing of the component can be achieved.

According to a development of the inventive method, it can be provided that, in step B), the rotational movement takes place in a housing, wherein the residues of the liquid plastic which are removed by the centrifugal force are caught by the housing.

The residues of the liquid plastic which are removed from the component by the centrifugal force can thus be reused or at least collected and reprocessed for reuse.

It can also be provided that the rotational movement in step B) takes place at a rotational speed of between 200 revolutions per minute and 1000 revolutions per minute, preferably at a rotational speed of between 300 revolutions per minute and 800 revolutions per minute.

At these rotational speeds, a good cleaning effect is achieved without the component, which is not yet fully cured after the generation of the component, being deformed. These rotational speeds have, in particular, been shown to be suitable for dental moldings which conventionally have dimensions between 5 mm and 150 mm.

It can also be provided that a hollow model or a hollow form is produced as the component.

The production of hollow models and hollow forms by means of the inventive method is particularly advantageous since the internal surfaces of hollow models and hollow forms are not easy to clean in another manner, since an air flow is only able to reach them with difficulty or the cleaning fluid used settles in the hollow forms or hollow models and can only be removed again with difficultly.

It can furthermore be provided that, in step B), an air flow, in particular a compressed air flow, is blown onto the component.

An additional cleaning effect can be achieved by the air flow. Moreover, the regions of the surface of the component which are situated closely adjacent to the axis of rotation or axes of rotation can therefore be reached by the air flow and the air flow can propel the residues of the liquid plastic which adhere to these parts radially outwards so that they can be removed there, propelled by the centrifugal force.

It can also be provided that the angular speed of the at least rotational movement and/or an angular acceleration to reach the angular speed of the at least rotational movement is controlled depending on the form of the component so that destruction or deformation of the component during the at least one rotational movement is prevented.

As strong a rotation as possible can thus be used for rapid and efficient cleaning of the component without the fear of destruction or deformation of the component. According to the invention, the consistency of the component can be taken into account in this case.

The objects on which the invention is based are also achieved by a 3D printing system for producing a component by means of stereolithography, the 3D printing system having a printing device for position-dependent and layer-wise curing of a liquid plastic, a control, in particular a computer having a computer program, wherein the control is suitable and provided for controlling the printing device according to step A) according to the inventive method in accordance with a virtual 3D model of a component to be generated, and a centrifuge module, with which the component generated by the printing device is rotatable by means of a rotational movement in such a way that residues of the liquid plastic is removable from the surface of the component by a centrifugal force resulting from the rotational movement.

The printing device preferably has a light source and a bath, wherein the bath is filled, or can be filled, with a liquid plastic which can be cured with the light of the light source.

The centrifuge module can be provided as a separate part from the printing device or it can be constructed together with the printing device. In the latter case, it can, for example, be provided that the generated component is lifted out of a bath of the liquid plastic and is set in rotating motion there by means of the centrifuge module. The centrifuge module can have an electric motor for generating the rotational movement and a holder for securing the component or a carrier, wherein the component has been generated on the carrier. In theory, the centrifuge module can also be used during the generation of the component by means of the printing device.

In this case, the 3D printing system can also have a center-of-gravity calculation module for determining the position of the center of gravity of the virtual 3D model of the component or a virtual 3D model of a system comprising the component, the carrier and all parts of the centrifuge module which rotate with the component, and a positioning module for determining the position or the position and the orientation of the component to be generated in the printing device.

The component in the 3D printing system can thus be generated in the position and possibly in the orientation which enables a rotational movement of the component during a rotation in the centrifuge module to be realized as easily as possible. In this case, it is possible to avoid a complex mounting of the component in the centrifuge module for absorbing imbalances, in that the component is positioned in such a way that the axis of rotation or the axes of rotation extend through the center of gravity calculated by the center-of-gravity calculation module.

In the present case, orientation refers to a position of the component in space relative to the printing device, or a position of the system comprising the component, carrier and possibly parts of the centrifuge module which rotate with the component relative to the non-rotating parts of the centrifuge module, which can be achieved by a rotation of the component with respect to the printing device or a rotation of the system with respect to the non-rotating parts of the centrifuge module. A change in the orientation of the component is therefore achieved by a rotation of the component with respect to the printing device, or a change in the orientation of the system is therefore achieved by a rotation of the system with respect to the centrifuge module. On the other hand, a change in the position of the component is achieved by a translatory movement of the component with respect to the printing device and a change in the position of the system is achieved accordingly by a translatory movement of the system with respect to the centrifuge module.

In this case, it can be provided that the positioning module is connected to the center-of-gravity calculation module and has access to the center of gravity determined by the center-of-gravity calculation module, and is programmed to determine the position or the position and the orientation of the component to be generated in the printing device depending on the center of gravity calculated by the center-of-gravity calculation module.

It is hereby ensured that the subsequent axis of rotation or axes of rotation extend through the center of gravity of the component or the system comprising the component, carrier and possibly parts of the centrifuge module which rotate with the component, and therefore an imbalance does not arise during the rotational movement in the centrifuge module.

It can furthermore be provided that the printing device has a holder for securing a carrier, wherein the component can be generated on the carrier, wherein the printing device preferably has at least one carrier.

The component can thus be transferred to the centrifuge module on the carrier without subjecting the generated component to a mechanical load.

It can also be provided that the 3D printing system is designed for implementing an inventive method.

The 3D printing system thus has the advantages of the inventive method.

Finally, a post-curing module can also be provided for post-curing the component by means of light or temperature or by means of light and temperature, wherein the component is rotatable during the post-curing in the post-curing module and wherein the post-curing module is preferably constructed in one piece with the centrifuge module.

A fully automatic 3D printing system is hereby provided, in which the component is ready for direct use. At the same time, it is possible to make use of the option of rotating the component to simplify the construction of the post-curing module and an improvement in the homogeneity of the post-curing can be achieved.

The invention is based on the surprising finding that, as a result of the at least one rotational movement of the component, it is possible to use the centrifugal forces produced thereby to remove at least some of the plastic residue adhering to the component after the generation of the component, and possibly also other impurities, from the component, at least to the extent that simple and brief post-cleaning with isopropanol or another cleaning fluid is sufficient to clean the component. After this, or with a subsequent post-curing step, the component is then ready for further use. In this case, the cleaning should take place before the post-curing so that adhering residues of the liquid plastic from which the component was manufactured do not also undergo curing and thereby distort or impair the desired form of the component. With the invention, it was surprisingly also found that, with a moderate number of revolutions, although the centrifugal forces are sufficient to remove the residues of the liquid plastic, deformations of the not yet fully cured component need not be feared. In this case, the maximum rotational speed which can be used depends on the radial size of the component with respect to the axis/axes of rotation used, the liquid plastic used and the stereolithographic process used in terms of the wavelength and output of the light source, but also the selected raster density and the focus of the light source. The precise geometry of the generated component also plays a role to a certain extent. In this regard, thin webs which connect the radially outer high-mass regions to the axis of rotation are, for example, more likely to break than solid components.

Through the use of the centrifugal force, the present invention enables the surface and cavities of additively manufactured components to be freed of uncured plastic residues or synthetic resin residues. In this case, it is possible to place the building platform or part of the building platform including printed parts directly in the cleaning arrangement. The process is quicker and more efficient than conventional cleaning processes or printing processes. Moreover, better reproducibility can be realized.

The invention principally replaces the manual pre-cleaning, which can, however, be regarded as particularly user-unfriendly. The post-cleaning, if it cannot be replaced completely, can at least be facilitated considerably. In particular, the cleaning fluid becomes dirty much more slowly during the post-cleaning than is the case for conventional final cleaning with the cleaning fluid, since most of the liquid plastic is removable by means of the at least one rotational movement.

The user works less with the liquid synthetic resin or the liquid plastic and therefore has less physical contact with these substances. As a result, less personal protective equipment is required. The noise to which the user of a compressed-air pistol is exposed and the breathing-in of vapors of the liquid plastic are also avoided by the method. Safety glasses are no longer strictly required, for example. A more odorless cleaning is furthermore also possible without a vent, since the liquid plastic or the liquid synthetic resin is not so highly atomized and the cleaning can be carried out in a closed housing. The process reliability is also increased since manual errors when cleaning the component manually with compressed air can be eliminated.

The 3D printing system described here comprises an automated cleaning arrangement and is also suitable for a fully automated process chain for washing and possibly also for post-curing the component.

BRIEF DESCRIPTION OF THE DRAWINGS

Further exemplary embodiments of the invention are explained below with reference to five schematically illustrated figures, albeit without thereby restricting the invention. The figures show.

For the sake of clarity, the same reference signs are sometimes also used in the figures for different but similar parts, even in different embodiments, for example in different embodiments of the blower pipes, which are denoted by the reference sign 26 throughout the description below of the figures and in all figures.

DETAILED DESCRIPTION

Figure 1:
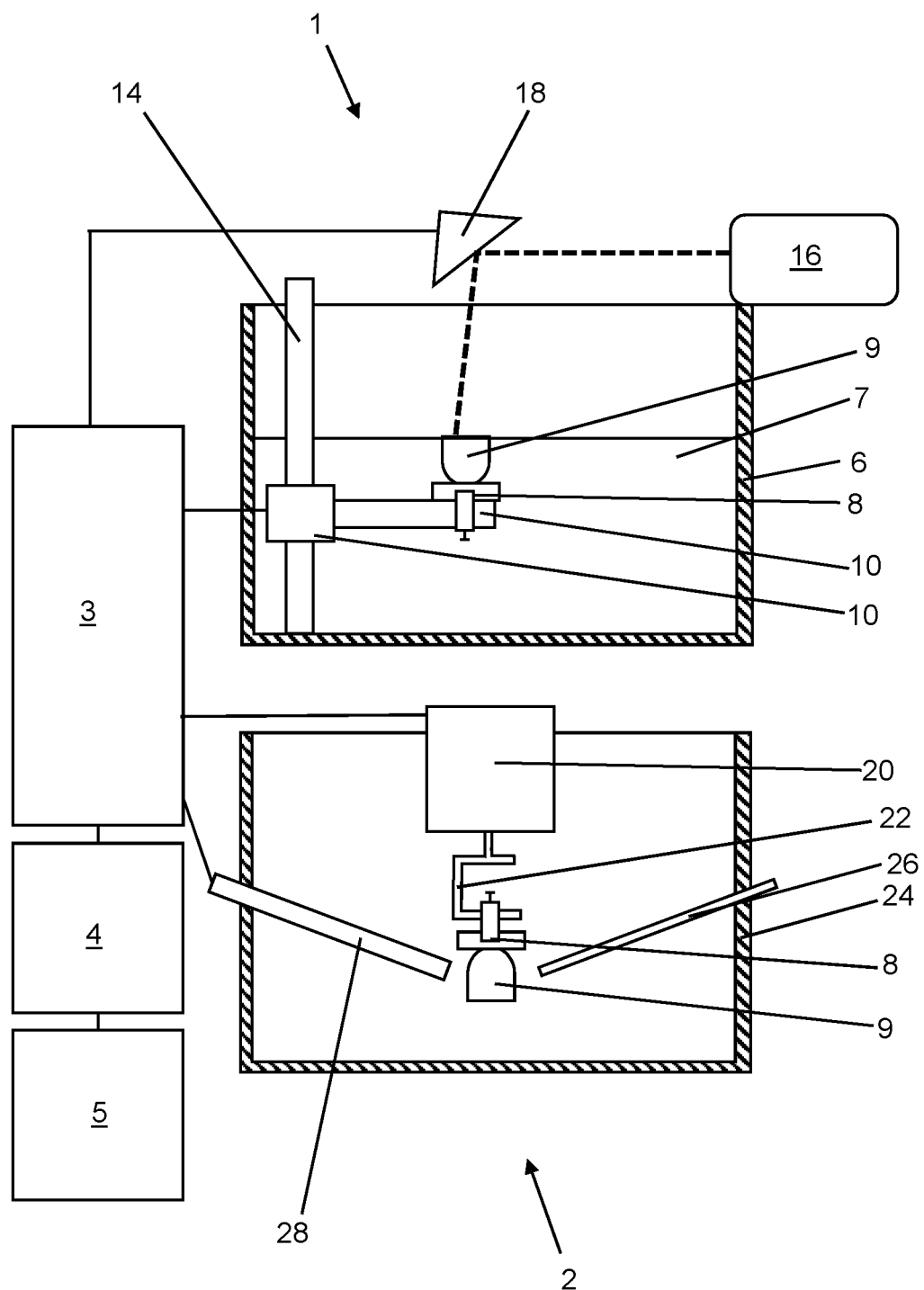
FIG. 1: a schematic view of an inventive 3D printing system with a centrifuge module for implementing an inventive method.

FIG. 1 shows a schematic view of an inventive 3D printing system for implementing an inventive method and for producing a component 9. The printing system comprises the actual stereolithographic printing device 1 and a centrifuge module 2. A control 3 is connected to the printing device 1 and to the centrifuge module 2 and, in this regard, is capable of controlling the printing device 1 and the centrifuge module 2. A suitably programmed computer can be used as the control 3. The control 3 assumes the control of the CAM and is also used for calculating the CAD. The control 3 has a positioning module 4 for calculating the position or the position and the orientation of the component 9 to be generated and a center-of-gravity calculation module 5 for calculating the position of the center of gravity in the component 9 to be generated.

The printing device 1 has a bath 6 for a photopolymerizable liquid plastic 7 from which the component 9 is produced. A photocurable synthetic resin, for example an acrylic resin, epoxy resin or vinyl ester resin, is used as the liquid plastic 7. The component 9 is generated on a carrier 8, which is releasably connected to a movable platform 10 of the printing device 1. The bath 6 is generously filled with the liquid plastic 7 so that the component 9 to be generated can be fully immersed with the carrier 8 in the liquid plastic 7.

The carrier 8 is connected, or connectable, to the movable platform 10 in a defined position and orientation. The position and the orientation of the carrier 8 are stored as a data set in the control 3 and in the positioning module 4 and are taken into account by the positioning module 4 when constructing the component 9 and when calculating the position or the position and the location of the component 9.

The platform 10 is at least vertically adjustable within the bath 6 (from top to bottom in FIG. 1), although it can also be adjustable in the plane perpendicular thereto. For this purpose, the platform 10 is arranged on a post 14 such that it is displaceable in the longitudinal direction, which post stands vertically 6 in the bath. The adjustment of the platform 10 is controlled by the control 3 during the generation of the component 9.

The printing device 1 also comprises a laser 16, whereof the wavelength is suitable for curing the liquid plastic 7. The laser beam (illustrated as a bold dashed line in FIG. 1) generated by the laser 16 is deflected into the bath 6 by a rotatably movably mounted and controllable mirror 18. The inclination of the movable mirror 18 can be adjusted in two mutually perpendicular axes, for example via stepping motors (not shown). The control 3 adjusts the inclination of the movable mirror 18 in space so that the entire printing procedure is controllable by the control 3.

To produce the component 9, the carrier 8 is secured on the platform 10. Layers of the liquid plastic 7 are then cured on the carrier 8 and on top of one another by means of the laser beam and the component 9 is therefore constructed layer by layer. In this case, the control of the laser beam is realized via the inclination of the mirror 18, which is adjusted by the control 3. For each layer of the component 9, the carrier 8 is lowered deeper in the bath 6 or in the liquid plastic 7, so that the upper layer of the component 9 is always adjacent to the surface of the liquid plastic 7 and is therefore reachable by the laser beam. The platform 10, and therefore the height of the component 9 in the liquid plastic 7, is likewise controlled by the control 3 in this case.

After the component 9 has been fully generated in the printing device 1, the carrier 8 with the component 9 thereon is removed from the platform 10 and secured in the centrifuge module 2.

The centrifuge module 2 has a motor 20, which is controllable by the control 3. The shaft of the motor 20 is connected, or connectable, to the carrier 8 via a quick-release clamping device 22. In this case, the carrier 8 can be clamped in the quick-release clamping device 22 in such a way that the position and the orientation of the carrier 8 are fixed with respect to the motor 20.

The carrier 8 with the component 9 is moved in a housing 24 of the centrifuge module 2. The housing 24 catches the liquid plastic dripping from the surface of the component 9. The liquid plastic can be conducted back into the bath 6 of the printing device 1, wherein, for this purpose, the liquid plastic can be previously cleaned and/or filtered.

By means of a blower pipe 26, whereof the tip forms a compressed-air nozzle, the component 9 can be additionally exposed to an air flow which promotes the separation of residues of the liquid plastic from the surface of the component 9. A light source 28 can furthermore be used for post-curing the component 9.

Figure 2:
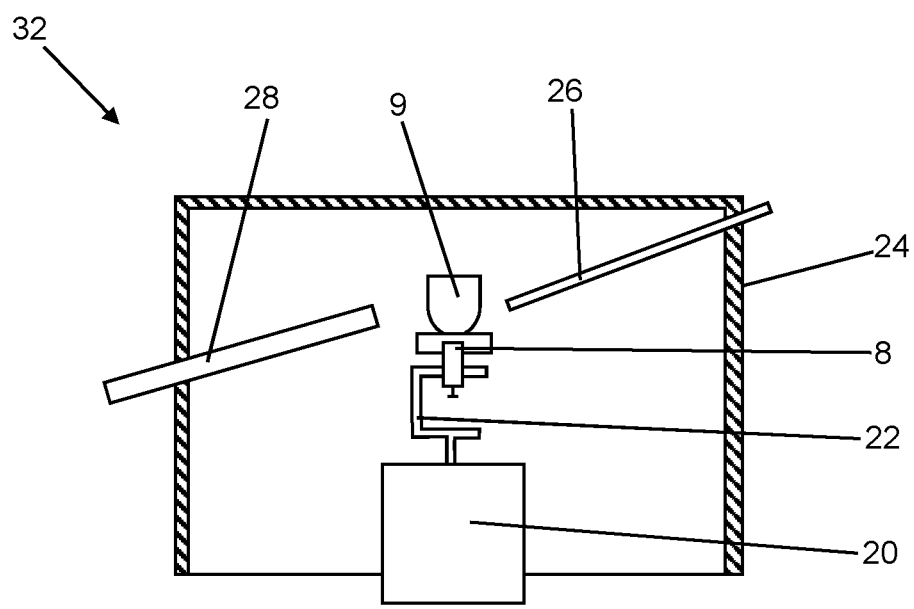
FIG. 2: a schematic view of a second alternative centrifuge module for implementing an inventive method.
Figure 3:
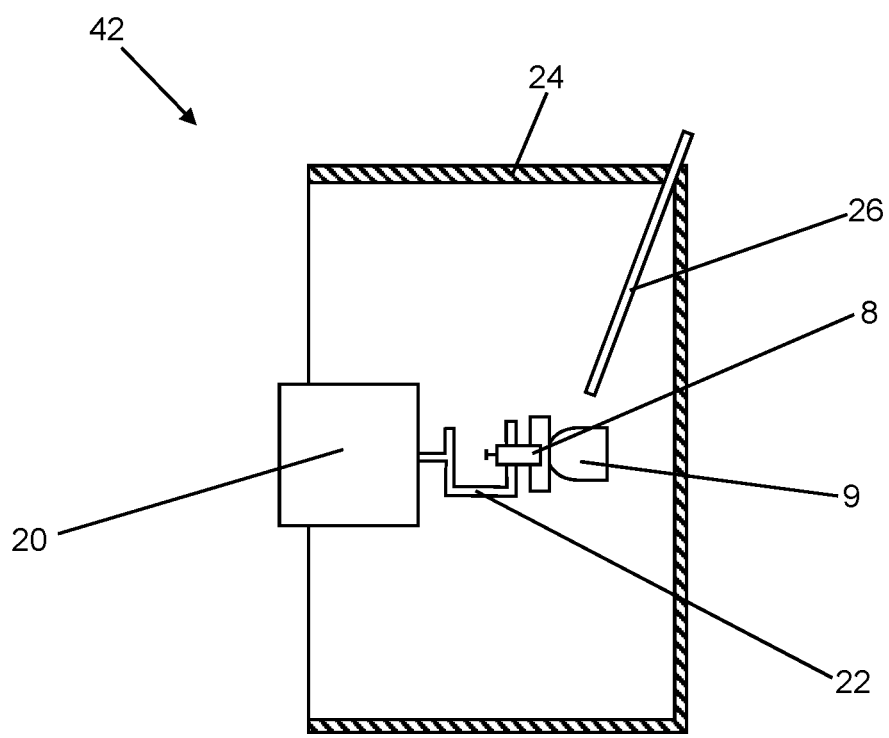
FIG. 3: a schematic view of a third alternative centrifuge module for implementing an inventive method.
Figure 4:
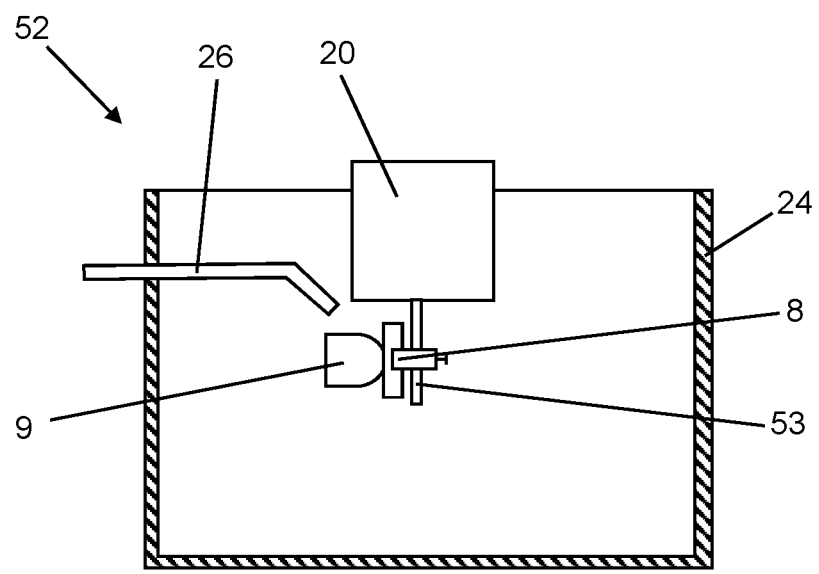
FIG. 4: a schematic view of a fourth alternative centrifuge module for implementing an inventive method.

In FIGS. 2 to 4, variants of a centrifuge module 32, 42, 52 are illustrated, which can readily replace the centrifuge module 2 according to FIG. 1. In the centrifuge module 32 according to FIG. 2, the housing 24 is designed to be open at the bottom. The liquid plastic dripping from the component 9 can thus be caught directly. Moreover, the inclination of the blower pipe 26 relative to the component 6 is altered. Otherwise, the centrifuge module 32 according to FIG. 2 is the same as the centrifuge module 2 according to FIG. 1.

In the centrifuge module 42 according to FIG. 3, the housing 24 is open at the side and the component 9 is rotated about a horizontal axis of rotation. The gravitation can thus be better used for the dripping of the liquid plastic, since the centrifugal force is added to the gravitational force in a (downward) direction. Moreover, the inclination of the blower pipe 26 relative to the component 6 is altered. Otherwise, the centrifuge module 42 according to FIG. 3 is the same as the centrifuge module 2 according to FIG. 1.

In the centrifuge module 52 according to FIG. 4, the housing 24 is open at the top. The component 9 is rotated about a vertical axis of rotation 53. In this case, the axis of rotation 53 is not located within the component 9. This can result in an imbalance. To prevent the imbalance, it can be provided that two mutually opposing carriers (not shown) with components are secured on the axis of rotation 53. The advantage of attaching the component 9 outside the axis of rotation consists in that, as a result of the larger radial spacing of the component from the axis of rotation 53, a greater centrifugal force can be achieved with the same rotational speed. However, the component 9 must then be sufficiently stable and cured to the extent that the forces which arise in this case do not deform or destroy the component 9. Moreover, the blower pipe 26 has a bend. Otherwise the centrifuge module 52 according to FIG. 4 is the same as the centrifuge module 2 according to FIG. 1.

Figure 5:
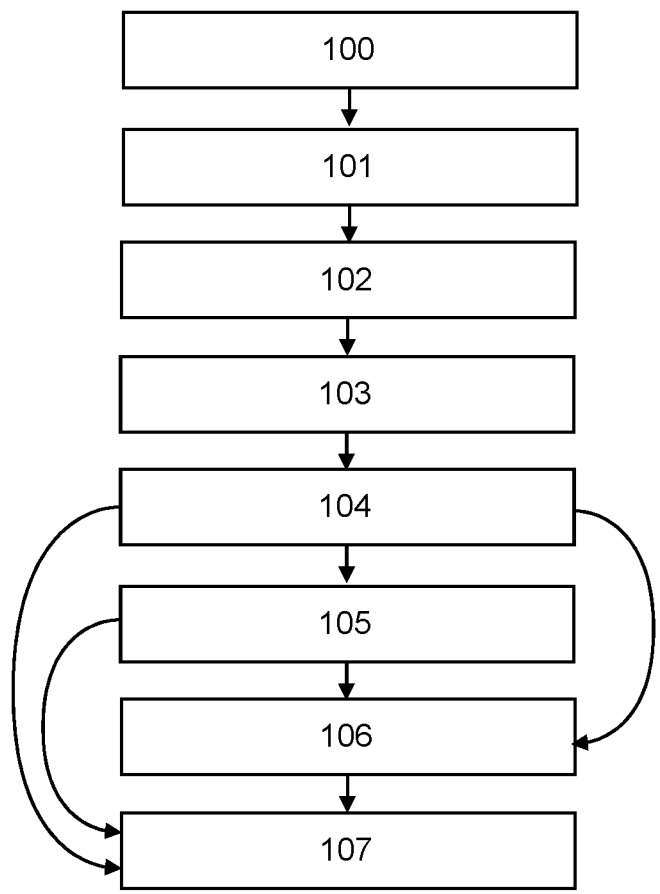
FIG. 5: the sequence of an inventive method for producing a component by means of stereolithography.

An exemplary method is explained below with reference to the 3D printing system shown in FIG. 1 with a centrifuge module 2, 32, 42, 52 according to FIGS. 1 to 4. The sequence of the exemplary method is illustrated in FIG. 5.

In a first operating step, a virtual three-dimensional model of the component 9 to be generated, such as a dental molding or a model of an oral cavity situation of a patient, is calculated by means of CAD in the control 3.

Then, in a next operating step 101, the center of gravity of the virtual three-dimensional model of the component 9 is determined by means of the center-of-gravity calculation module 5. In this case, it is assumed that the virtual model of the component 9 has a homogeneous density. It is, however, also possible to calculate the center of gravity of a component which is composed of different materials having different densities. If this is desired, and the carrier 8 and possibly also further rotating parts of the centrifuge module 2 contribute to an imbalance during a rotation in the centrifuge module 2, the center of gravity of the entire system of the component 9, carrier 8 and possibly rotating parts of the centrifuge module 2 can also be calculated by means of the center-of-gravity calculation module 5. For the present consideration, it is, however, sufficient to assume that the centrifuge module 2 is constructed such that, when the carrier 8, for which the form and mass distribution is known, is installed in its correct position in the centrifuge module 2, all rotational movements of the centrifuge module 2 take place about axes of rotation which extend through the center of gravity of the system of all rotating parts of the centrifuge module 2 and carrier 8. This can be achieved, for example, in that, for all moments of inertia of the rotating parts of the centrifuge module 2 and the carrier 8, counterweights are positioned in such a way that all imbalances are compensated. The system is then balanced. Therefore, the aim of the calculation of the center-of-gravity calculation module 5 in operating step 101 and the calculation of the positioning module 4 in the subsequent operating step 102 is that an imbalance resulting from the component 9 printed onto the carrier 8 does not arise in the centrifuge module 2 or that the speed of the movement of the component 9 is kept as low as possible to protect the component 9.

In the operating step 102 following the operating step 101, the virtual model of the component 9 is positioned on the model of the carrier 8 by means of the positioning module 4 in such a way that, during a known rotation of the carrier 8 about at least one axis of rotation, the component 9 alone, or the model for this, or the component 9 including all rotating parts within the centrifuge module, such as those of the carrier 8 and possibly present rotating securing parts of the centrifuge module 2, the at least one axis of rotation, preferably all axes of rotation, are aligned in such a way that they extend through the center of gravity of the component 9 calculated in operating step 101 or through a region closely adjacent to this center of gravity. It is sufficient if the at least one axis of rotation extending through the component 9 extends closely past the center of gravity of the component 9 in such a way that the mounting of the carrier 8 in the centrifuge module 2 does not have to be reinforced in a structurally complex manner in order to be able to absorb the imbalances produced as a result of the deviation from the center of gravity during a rotational movement, and/or the generated component 9 is not exposed to too strong forces so as to not deform or destroy the not yet fully cured component 9. For the present consideration, it is sufficient to assume that neither the carrier 8 nor the rotating parts of the centrifuge module 2 cause an imbalance, so that the calculation of the position or the position and the orientation of the component 9 on the carrier 8 is sufficient to eliminate imbalances or to keep them low. The position of the carrier 8—for which the form and the mass distribution is known—in the printing device 1 and in the centrifuge module 2 is known. In particular, the centrifugal forces in the component 9, which arise during the respective rotational movement, and the forces resulting from an imbalance are also so low that a deformation or destruction of the not yet fully cured component 9 is prevented.

In a next operating step 103, by means of the printing device 1, the component 9 is printed on the carrier 8 from plastic, layer by layer, using stereolithography (as a CAM process), wherein the form of the component 9 corresponds to the virtual 3D model of the component 9 according to the CAD calculation in operating step 100 and the position or the position and the orientation of the component 9 on the carrier 8 are realized according to the calculation of the positioning module 4 in operating step 102. The actual printing takes place using a known stereolithographic process. In theory, the carrier 8 can also be printed together with the component 9.

After the component 9 has been printed, it is removed from the printing device with the carrier 8 and secured in the centrifuge module 2. In an operating step 104 which now takes place, the component 9 in the centrifuge module 2 is rotated about the axis of rotation previously used for the calculation or about the axes of rotation previously used for the calculation. During this, liquid residues of the liquid plastic 7 are removed from the surface of the generated component 9 by centrifugation and caught in the housing 24. In this case, the centrifugal force separates the adhering liquid residues of the liquid plastic 7 from the surface of the component 9. The separation can be promoted by an air flow, which is directed onto the component 9 by the blower pipe 26. The rotational movement of the component 9 can take place both in a single direction and in an alternating manner, so that the angular speed follows a sinus function or the direction is at least altered repeatedly. The acceleration forces and centrifugal forces arising in this case, which act within the generated component 9, must only be of such a strength here that deformation or destruction of the component 9 in its present (curing) state at this time cannot occur.

It can preferably be provided that the printing device 1 and the centrifuge module 2 are constructed in one piece. The generated component 9 can then be removed from the liquid plastic 7 by simple lifting, for example, and then rotated. The walls of the bath 6 are then the housing 24 and the liquid plastic residues fall or flow into the reservoir of the liquid plastic 7, which is arranged beneath the component 9.

In a subsequent operating step 105, which takes place optionally as required, residues of the plastic and other impurities still remaining on the surface of the component 9 are rinsed and removed with a cleaning fluid, such as isopropanol, in the course of a post-cleaning.

In a likewise optional operating step 106 the isopropanol can be removed by centrifugation.

In a final operating step 107, the component 9 is post-cured with the aid of light from the light source 28 at a slightly increased temperature of between 35° C. and 90° C. In this case, the component 9 is rotated about at least one axis of rotation and, for this purpose, is located on the carrier 8.

The component 9 is separated from the carrier 8 and the connecting surface to the carrier 8 is post-processed if necessary. The component 9 is then complete and can be used, for example, for constructing a dental prosthesis or for adapting dental prosthesis parts.

The features of the invention which are disclosed in the description above and in the claims, figures and exemplary embodiments can be essential to the realization of the invention in its various embodiments both individually and in any combination.

LIST OF REFERENCE NUMERALS

1 Printing device
2 Centrifuge module
3 Control
4 Positioning module
5 Center-of-gravity calculation module
6 Bath
7 Liquid plastic
8 Carrier
9 Component
10 Platform
14 Post
16 Laser
18 Movable mirror
20 Motor
22 Quick-release clamping device
24 Housing
26 Blower tube
28 Light source
32 Centrifuge module
42 Centrifuge module
52 Centrifuge module
53 Axis of rotation
100 Operating step: Calculating a 3D model of the component to be generated
101 Operating step: Calculating the center of gravity of the 3D model
102 Operating step: Calculating the position and possibly the orientation of the 3D model on the carrier
103 Operating step: Printing the component by means of stereolithography
104 Operating step: Cleaning the component by means of the centrifuge module
105 Operating step: Post-cleaning the component with cleaning fluid
106 Operating step: Removing the cleaning fluid from the component by centrifugation
107 Operating step: Post-curing the component

The invention claimed is:

1. A method for producing a component by stereolithography, having the steps of:
   (A) determining a position of a center of gravity of a virtual 3D model of a component or a virtual 3D model of a system comprising the component, a carrier, and all parts of a centrifuge module which rotate with the component,
   (B) generating the component in accordance with the virtual 3D model of the component by curing a liquid plastic on the carrier using stereolithography, wherein the component is generated on the carrier in such a way that the component is positioned on the carrier such that:
   at least one axis of rotation extends through a region of the center of gravity of the component determined in step (A), or
   at least one axis of rotation extends through the region of a center of gravity of a system comprising the component, the carrier, and all parts of the centrifuge module which rotate with the component, and
   (C) cleaning the component through at least one rotational movement of the component about at least one said axis of rotation, wherein residues of the liquid plastic are removed from a surface of the component by a centrifugal force resulting from the rotational movement.

2. The method according to claim 1, wherein at least one said axis of rotation extends through the center of gravity of the component or the center of gravity of the system.

3. The method according to claim 1, wherein at least 50% of the residues of the liquid plastic which are present on the surface of the component are removed by the centrifugal force.

4. The method according to claim 3, wherein at least 85% of the residues of the liquid plastic which are present on the surface of the component are removed by the centrifugal force.

5. The method according to claim 3, wherein at least 95% of the residues of the liquid plastic which are present on the surface of the component are removed by the centrifugal force.

6. The method according to claim 1, wherein the carrier with the component thereon will be secured, or is secured, in the centrifuge module to clean the component in step (C).

7. The method according to claim 6, wherein the axis of rotation is specified by a position of the carrier in the centrifuge module or the axes of rotation are specified by the position of the carrier in the centrifuge module.

8. The method according to claim 1, comprising a step (A2) of determining a position or a position and an orientation of the component to be generated on the carrier before step (B), wherein the component's position on the carrier is determined in such a way that the at least one axis of rotation of the component extends through a region around the center of gravity of the component or the at least one axis of rotation extends through a region around the center of gravity of the system comprising the component, the carrier, and all parts of the centrifuge module which rotate with the component, and in step (B) generating the component in the position determined according to step (A2) or the position and the orientation determined according to step (A2) on the carrier.

9. The method according to claim 8, wherein the at least one axis of rotation extends precisely through the center of gravity of the component or precisely through the center of gravity of the system.

10. The method according to claim 8, wherein, in step (A2), the center of gravity of the component or the system is determined with the aid of the virtual 3D model and the position or the position and the orientation of the component to be generated on the carrier is determined thereby.

11. The method according to claim 1, comprising curing the liquid plastic in step (B) using light, UV light, or laser light, wherein a photocurable plastic is used as the liquid plastic.

12. The method according to claim 11, wherein the photocurable plastic is an acrylic resin, epoxy resin, or vinyl ester resin.

13. The method according to claim 1, comprising producing a dental model or a model of an oral cavity for preparing a dental prosthesis as the component, or producing a model of a dental prosthesis or dental prosthesis part, as the component and generated in step (B).

14. The method according to claim 1, comprising a step (D) of post-cleaning the component after step (C) with a cleaning fluid.

15. The method according to claim 14, wherein the cleaning fluid is isopropanol.

16. The method according to claim 14, comprising removing residues of the cleaning fluid from the surface of the component by a centrifugal force resulting from the rotational movement in step (D).

17. The method according to claim 1, comprising a step of post-curing the component after step (C), wherein, during the post-curing step, the component is rotated about the axis of rotation or is rotated about at least one of the axes of rotation.

18. The method according to claim 17, wherein the post-curing step takes place via post-exposure to light or a heat treatment or via post-exposure to light and a heat treatment.

19. The method according to claim 1, wherein, in step (C), the rotational movement takes place in a housing of the centrifuge module, wherein the residues of the liquid plastic which are removed by the centrifugal force are caught by the housing.

20. The method according to claim 1, wherein the rotational movement in step (C) takes place at a rotational speed of between 200 revolutions per minute and 1000 revolutions per minute.

21. The method according to claim 20, wherein the rotational movement in step (C) takes place at a rotational speed of between 300 revolutions per minute and 800 revolutions per minute.

22. The method according to claim 1, comprising producing a hollow model or a hollow form as the component.

23. The method according to claim 1, wherein, in step (C), an air flow is blown onto the component.

24. The method according to claim 23, wherein the air flow in step (C) is a compressed air flow.

25. The method according to claim 1, comprising controlling an angular speed of the at least one rotational movement and/or an angular acceleration to reach an angular speed of the at least one rotational movement depending on a form of the component so that destruction or deformation of the component during the at least one rotational movement is prevented.

26. A 3D printing system for producing a component by stereolithography, the 3D printing system having
a printing device for position-dependent and layer-wise curing of a liquid plastic,
a control, wherein the control is suitable and provided for controlling the printing device in accordance with a virtual 3D model of a component to be generated, and
a centrifuge module, with which a component generated by the printing device is rotatable by a rotational movement in such a way that residues of the liquid plastic are removable from a surface of the component by a centrifugal force resulting from the rotational movement, with
a center-of-gravity calculation module for determining a position of a center of gravity of the virtual 3D model of the component or a virtual 3D model of a system comprising the component, the carrier, and all parts of the centrifuge module which rotate with the component, and
a positioning module for determining a position or a position and an orientation of the component to be generated in the printing device.

27. The 3D printing system according to claim 26 wherein the control is a computer having a computer program.

28. The 3D printing system according to claim 26, wherein the positioning module is connected to the center-of-gravity calculation module and has access to the center of gravity determined by the center-of-gravity calculation module, and is programmed to determine the position or the position and the orientation of the component to be generated in the printing device depending on the center of gravity calculated by the center-of-gravity calculation module.

29. The 3D printing system according to claim 26, wherein the printing device has a holder for securing a carrier, wherein the component is generatable on the carrier.

30. The 3D printing system according to claim 29, wherein the printing device has at least one of the carrier.

31. The 3D printing system according to claim 26, comprising a post-curing module for post-curing the component by light or temperature, wherein the component is rotatable during the post-curing in the post-curing module.

32. The 3D printing system according to claim 31, wherein the post-curing module is constructed in one piece with the centrifuge module.

33. The 3D printing system according to claim 26, wherein the 3D printing system is configured for implementing a method having the steps of:
(A) generating a component in accordance with a virtual 3D model of the component by curing a liquid plastic on a carrier using stereolithography, wherein the component is generated on the carrier in such a way that the component is positioned on the carrier such that:
at least one axis of rotation extends through a region of a center of gravity of the component, or
at least one axis of rotation extends through a region of a center of gravity of a system comprising the component, the carrier, and all parts of a centrifuge module which rotate with the component, and
(B) cleaning the component through at least one rotational movement of the component about the axis of rotation or about the multiple axes of rotation, wherein residues of the liquid plastic are removed from a surface of the component by a centrifugal force resulting from the rotational movement.

* * * * *